(12) United States Patent
O'Brien

(10) Patent No.: US 7,337,342 B1
(45) Date of Patent: Feb. 26, 2008

(54) POWER SUPPLY SEQUENCING DISTRIBUTED AMONG MULTIPLE DEVICES WITH LINKED OPERATION

(75) Inventor: Thomas J. O'Brien, Milpitas, CA (US)

(73) Assignee: Summit Microelectronics, Inc., Sunnyvale, CA (US)

( * ) Notice: Subject to any disclaimer, the term of this patent is extended or adjusted under 35 U.S.C. 154(b) by 391 days.

(21) Appl. No.: 11/119,307

(22) Filed: Apr. 28, 2005

(51) Int. Cl.
*G06F 1/00* (2006.01)

(52) U.S. Cl. ...................... 713/330; 713/300

(58) Field of Classification Search ............... 713/300, 713/330
See application file for complete search history.

(56) References Cited

U.S. PATENT DOCUMENTS

| | | | |
|---|---|---|---|
| 5,121,500 A * | 6/1992 | Arlington et al. ............ | 713/330 |
| 6,041,414 A * | 3/2000 | Kikuchi ...................... | 713/300 |
| 6,125,440 A * | 9/2000 | Osovets ...................... | 712/205 |
| 6,429,706 B1 * | 8/2002 | Amin et al. ................. | 327/143 |
| 6,879,139 B2 * | 4/2005 | Brown et al. ............... | 323/299 |
| 6,936,999 B2 | 8/2005 | Chapuis | |
| 6,949,916 B2 | 9/2005 | Chapuis | |
| 7,000,125 B2 | 2/2006 | Chapuis et al. | |
| 7,049,798 B2 | 5/2006 | Chapuis et al. | |

\* cited by examiner

*Primary Examiner*—Thomas Lee
*Assistant Examiner*—Michael Wang
(74) *Attorney, Agent, or Firm*—Fountainhead Law Group P.C.

(57) ABSTRACT

A system and method is provided to accomplish distributed power sequencing function of a large electronics system with minimum number of signals in the sequencing network without compromising the flexibility and expandability. In one embodiment of the invention, the power sequencing function is accomplished with two signals of the sequencing network: power_on/power_off signal and SEQ_LINK signal. The power_on/power_off signal controls whether the sequencing is in power_on mode for turning on power to multiple devices in a predetermined sequence or power_off mode for for turning off power to multiple devices in a reverse sequence. The SEQ_LINK signal controls when the sequence counters, located in each participating device, are allowed to count to the subsequent state. Each sequencing logic circuit of these participating devices responds to a predetermined sequence position to enable the power on or power off of the power supply it controls.

11 Claims, 6 Drawing Sheets

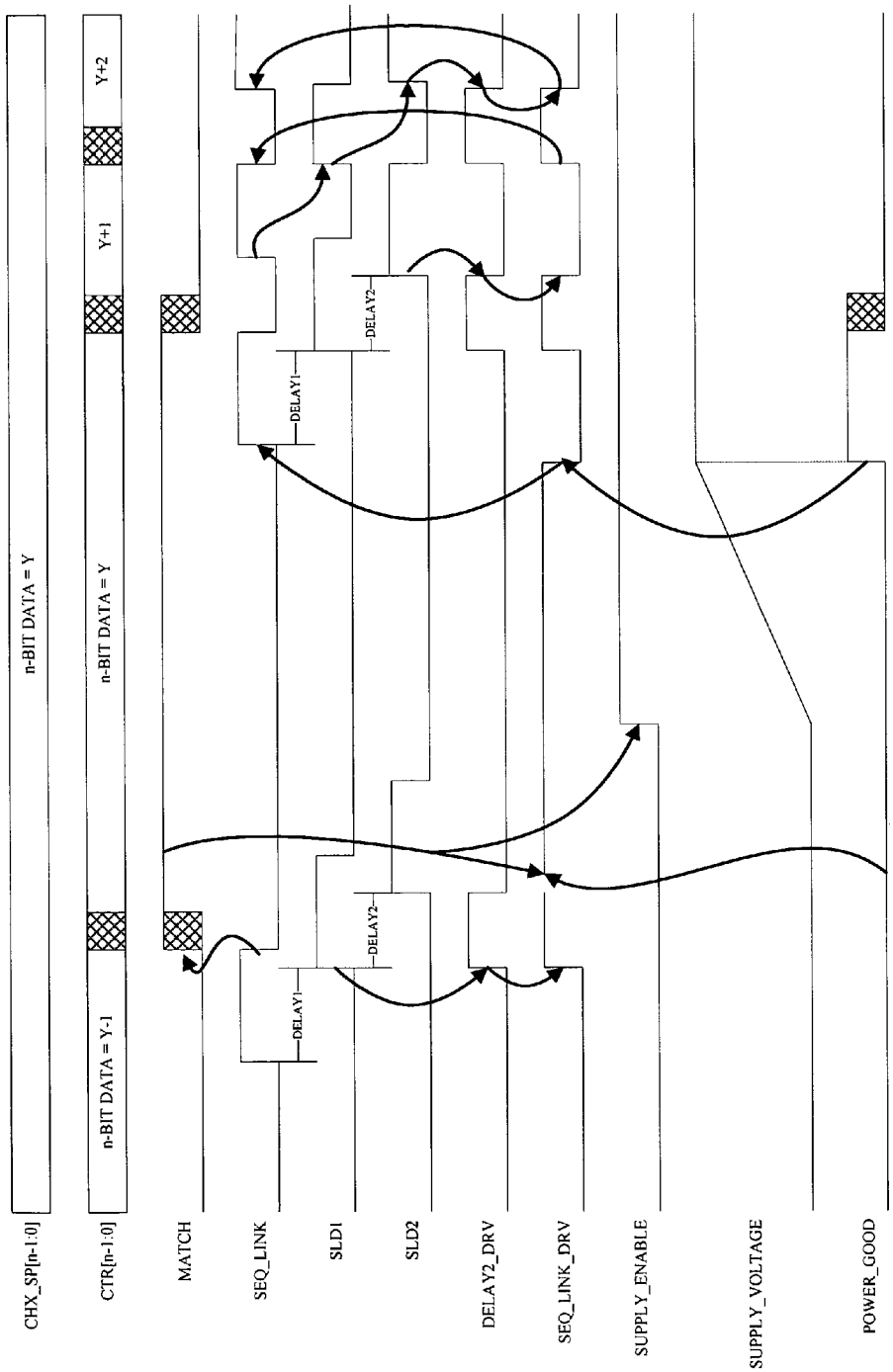

POWER SUPPLY SEQUENCING DISTRIBUTED AMONG MULTIPLE DEVICES WITH LINKED OPERATION

BACKGROUND

1. Field

The invention relates in general to electronics systems and, in particular to power management in electronics systems.

2. Related Art

Electronics systems are frequently comprised of multiple devices. It is often advantageous to have an automatic system for turning on power or turning off power to multiple devices in a predetermined sequence for functional purposes or for reliability considerations. Conventional power sequencing circuits employ centralized control circuitry to turn on power for a first device, then waits for a specified amount of programmed delay time before it turns on power for a second device and so on. Power off sequencing is done in the same manner typically in a reverse order to the power on sequencing. Each device requires its own connection with the centralized controller making system reconfiguration or expansion cumbersome. In a distributed power sequencing approach, each device includes sequencing logic circuit to participate in providing power sequencing function with the centralized control circuitry in a coordinated manner. The communications among the central control circuitry and each of the sequencing logic circuit on these participating devices are accomplished via signals in a sequencing network. The flexibility and expandability of the power sequencing function to support reconfiguration or expansion of the electronics system is limited by available signals in the sequencing network. Accordingly, there is a need for an improved system and method to accomplish the power sequencing function of a large electronics system with minimum number of signals in the sequencing network without compromising the flexibility and expandability.

SUMMARY

This invention enables seamless distribution of the power sequencing function, normally limited by available signals of a sequencing network in an electronics system, over multiple devices for expanding the functional capacity of the sequencing network for the system. In one embodiment of the invention, the power sequencing function is accomplished with two signals of the sequencing network: power_on/power_off signal and SEQ_LINK signal. The power_on/power_off signal controls whether the sequencing is in power_on mode for turning on power to multiple devices in a predetermined sequence or power_off mode for for turning off power to multiple devices in a reverse sequence. The SEQ_LINK signal controls when the sequence counters, located in each participating device, are allowed to count to the subsequent state. During power supply sequencing it is often necessary to monitor the supply output after it has been enabled to ensure that it turns on fully before sequencing the next supply. Using the open drain SEQ_LINK signal, any device can pull the signal low allowing it to hold-off the sequence until the power supply the particular device is monitoring has turned on or turned off fully. Once this has occurred, the device can let go of the SEQ_LINK signal allowing it to return high as long as no other device is pulling it low. The change in the state of the SEQ_LINK signal causes multiple linked devices to increment or decrement their sequence counters resulting in a sequenced operation in a coordinated manner. Each sequencing logic circuit of these participating devices responds to a predetermined state of its sequence counter to enable the power on or power off of the power supply it controls. This predetermined state of the sequence counter is called the sequence position.

BRIEF DESCRIPTION OF DRAWINGS

So that the manner in which the above recited features, advantages and objects of the present invention are attained and can be understood in detail, a more particular description of the invention, briefly summarized above, may be had by refrence to the embodiments thereof which are illustrated in the appended drawings.

It is to be noted, however, that the appended drawings illustrate only typical embodiments of this invention and are therefore not to be considered limiting of its scope, for the present invention may admit to other equally effective embodiments.

FIGS. 3A, 3B, and 3C are timing diagrams of the power sequencing system in accordance with an embodiment of the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
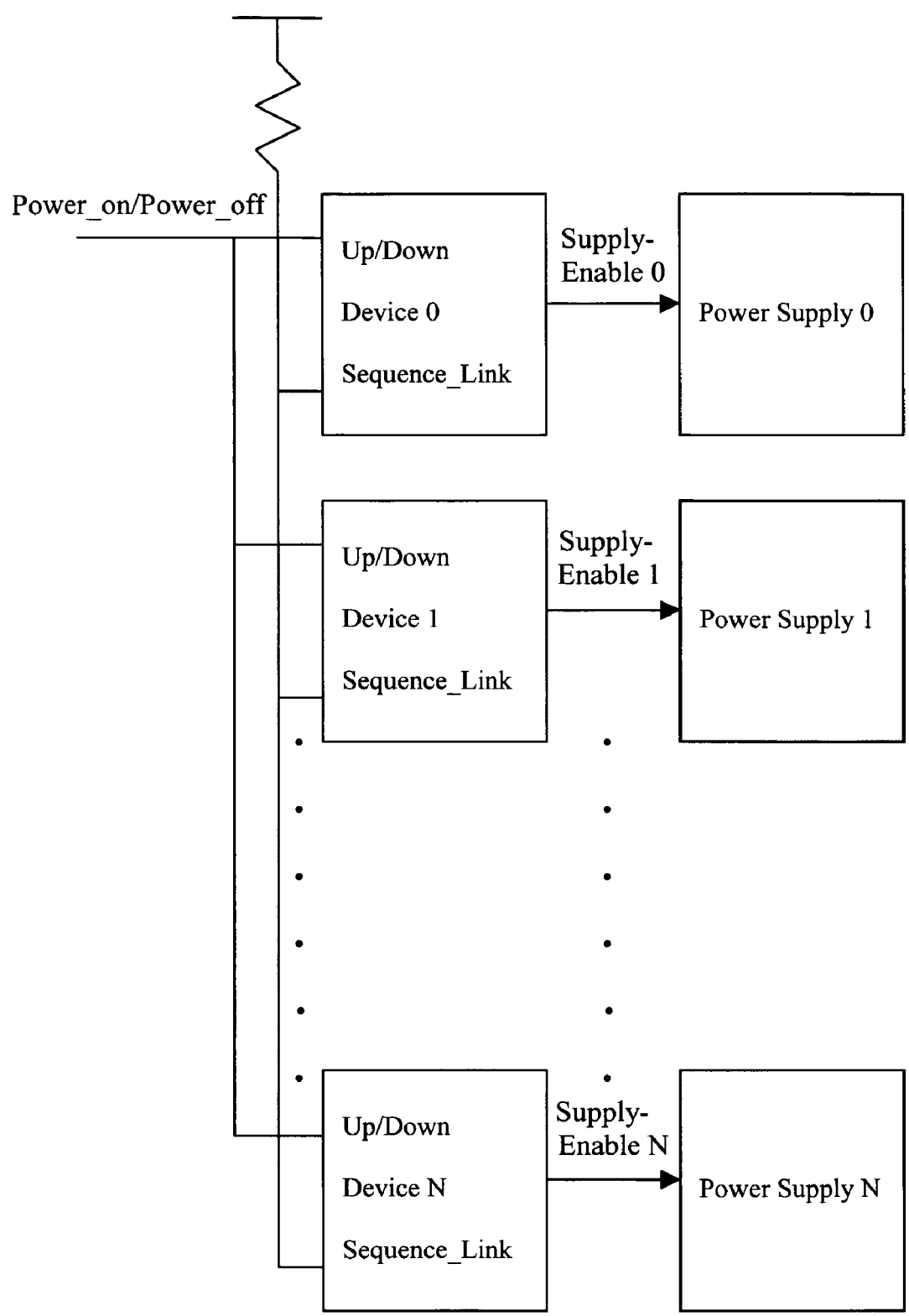
FIG. 1 is a diagram illustrating an electronics system wherein the system and method of the present invention may advantageously be utilized.

FIG. 1 is a diagram illustrating an electronics system comprising device 0, device 1, through device N for enabling and monitoring power supply 0, power supply 1, through power supply N via control signals supply_enable 0, supply_enable 1, through supply_enable N and supply_voltage 0, supply_voltage 1, through supply_voltage N. A power_on/power_off signal controls each device to be in a power on mode or a power off mode. Each device drives a SEQ_LINK signal via an open drain wired-OR circuit.

Figure 2:
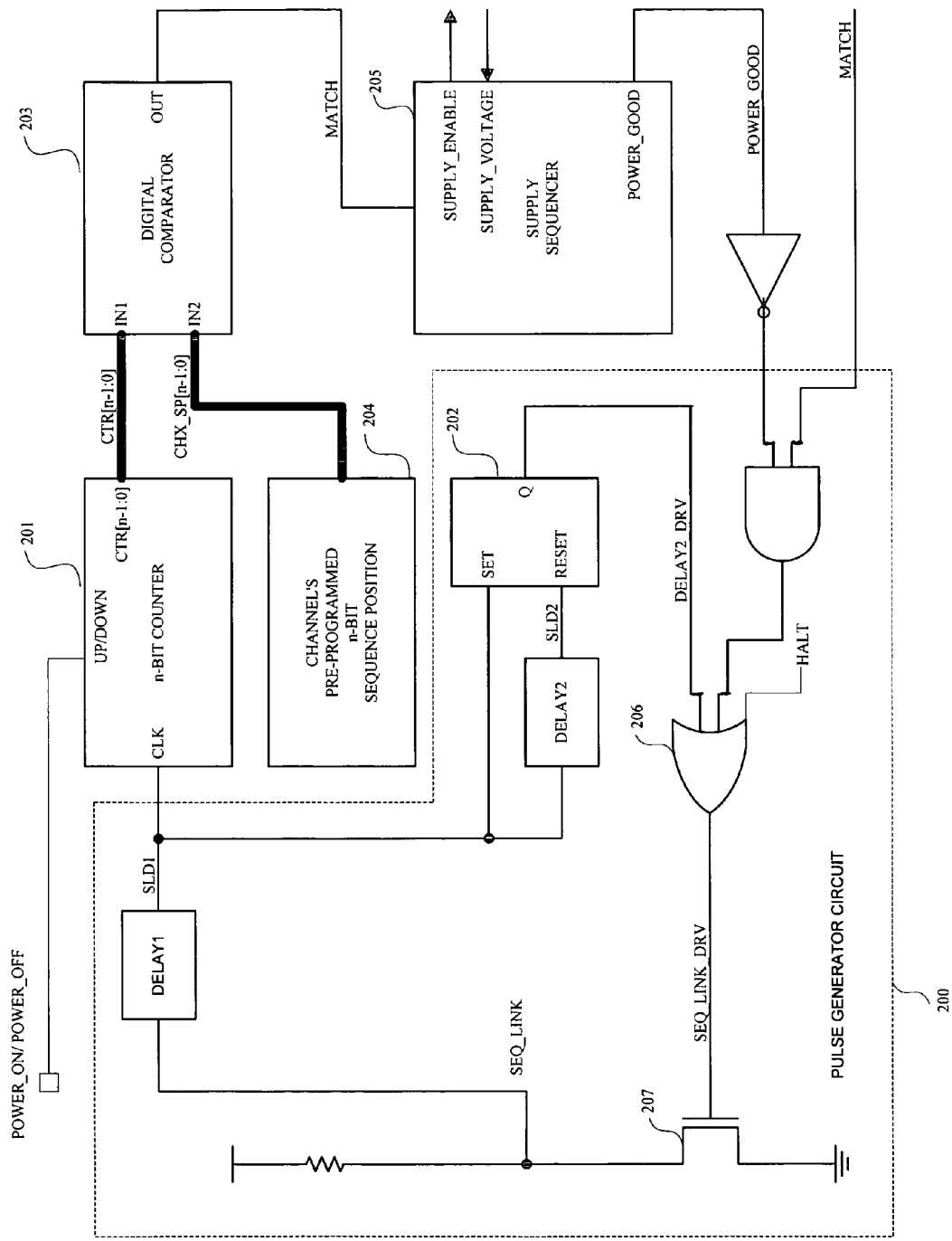
FIG. 2 is a more detailed block diagram of the sequencing logic circuit in a device of a power sequencing system in accordance with an embodiment of the present invention.

FIG. 2 is a more detailed block diagram of the sequencing logic circuit in each of the devices in FIG. 1. With the exception of the SEQ_LINK and POWER_ON/POWER_OFF being global signals in FIG. 1, the rest of the components and signals shown in FIG. 2 are local to each of the devices in FIG. 1.

A n-BIT COUNTER 201 has a negative edge triggered clock input CLK-driven by signal SLD1 which is a delayed version of signal SEQ_LINK. The n-BIT COUNTER 201 is configured by the signal POWER_ON/POWER_OFF to either increment or decrement a n-bit CTR[n-1:0] signal responding to the negative edge of the SLD1 signal.

A DIGITAL COMPARATOR 203 generates a MATCH signal by comparing the n-bit CTR[n-1:0] signal generated by the n-BIT COUNTER to a n-bit CHX_SP[n-1:0] signal generated by PRE-PROGRAMMED n-BIT SEQUENCE POSITION 204. The MATCH signal causes a SUPPLY SEQUENCER 205 to generate a SUPPLY_ENABLE signal which enables a power supply associated with the particular sequencing logic circuit. The PRE-PROGRAMMED n-BIT SEQUENCE POSITION 204 in each of the devices in FIG. 1 are independently configured according to a predetermined sequence.

The SUPPLY SEQUENCER 205 monitors the power supply and generates a POWEER_GOOD signal upon the power supply reaching a stable state after being enabled. The POWEER_GOOD signal and MATCH signal together generate a SEQ_LINK_DISABLE signal which can disable or enable a pulse generator circuit 200 composed of NOR gate 206, open drain transistor 207, DELAY1, DELAY2, and SET/RESET circuit 202. All of the pulse generator circuits 200 in each of the devices in FIG. 1 are disabled and enabled together according to the wired-OR operation of the open drain transistor connection to the global signal SEQ_LINK. While enabled, the pulse generator circuit 200 generates a SEQ_LINK signal with pulse high width equaling DELAY1 approximately and pulse low width equaling DELAY2 approximately. At the beginning of the power sequencing operation in each of the devices in FIG. 1, a HALT signal is deactivated and the pulse generator circuit 200 is enabled, signal SEQ_LINK increments or decrements the n-BIT COUNTER synchronously and repetitively until a MATCH signal is generated in one or more of the devices in FIG. 1. The MATCH signal causes the corresponding SUPPLY SEQUENCER 205 to generate a SUPPLY_ENABLE signal and to hold the corresponding POWER_GOOD signal in a low state prior to the corresponding power supply reaching a stable state after being enabled. The corresponding SEQ_LINK_DISABLE signal are held active high by the MATCH signal and the corresponding POWER_GOOD signal to disable the corresponding pulse generator circuit 200 with the SEQ_LINK signal being held at a low state. As a result, all of the pulse generator circuits 200 in each of the devices in FIG. 1 are disabled according to the wired-OR operation of the open drain transistor connection to the global signal SEQ_LINK. Upon all corresponding power supplies in each of the devices having a MATCH signal generated reaching stable state, all the corresponding SEQ_LINK_DISABLE signals are deactivated. As a result, all the pulse generator circuits 200 in each of the devices in FIG. 1 are again enabled and the n-BIT COUNTER in each of the devices in FIG. 1 continue to increment or decrement until a next MATCH signal is generated with another matching sequence position in one or more of the devices in FIG. 1. Additional power supplies in these one or more devices are enabled in the same way as described previously. In this fashion the SEQ_LINK signal eventually increment or decrement all the n-BIT COUNTER in each of the devices in FIG. 1 to a terminal state wherein all the power supplies in all devices in FIG. 1 are enabled. A HALT signal is generated at this point to disable all the pulse generator circuits in the system. The power sequencing operation is complete.

During the power sequencing operation, through the operation of the open drain wired-OR circuits, all of the pulse generator circuits 200 in each of the devices in FIG. 1 operate in a coordinated manner to generate the SEQ_LINK with pulse high width equaling DELAY1 approximately and pulse low width equaling DELAY2 approximately as long as none of the devices has a MATCH signal generated. Any one of device 0, device 1, through device N having a MATCH signal generated can hold SEQ_LINK signal at a low state and disable all the pulse generator circuits 200 in the system of FIG. 1.

FIG. 3A is a timing diagram illustrating the operation of a particular sequencing logic circuit in FIG. 2 wherein the the n-BIT COUNTER 201 is configured by the signal POWER_ON/POWER_OFF to increment in a power on mode. The PRE-PROGRAMMED n-BIT SEQUENCE POSITION 204 is configured to a value Y in this sequencing logic circuit. The timing diagram illustrates the timing sequences as the value of the n-bit CTR[n-1:0] signal is incremented from Y−1 through Y+2 by the n-BIT COUNTER 201 in this sequencing logic circuit. The cross hatched portion of CTR[n-1:0] signal, MATCH signal, and SEQ_LINK_DISABLE signal indicate the unstable transition period of the sequencing logic circuit. DELAY2 period is shown to be longer than the unstable transition period for proper operation of NOR gate 206 in the pulse generator circuit 200. DELAY1 is shown to be of a sufficient time period for proper operation of n-BIT COUNTER 201 as SEQ_LINK signal travels throughout the system in FIG. 1.

Figure 3B:
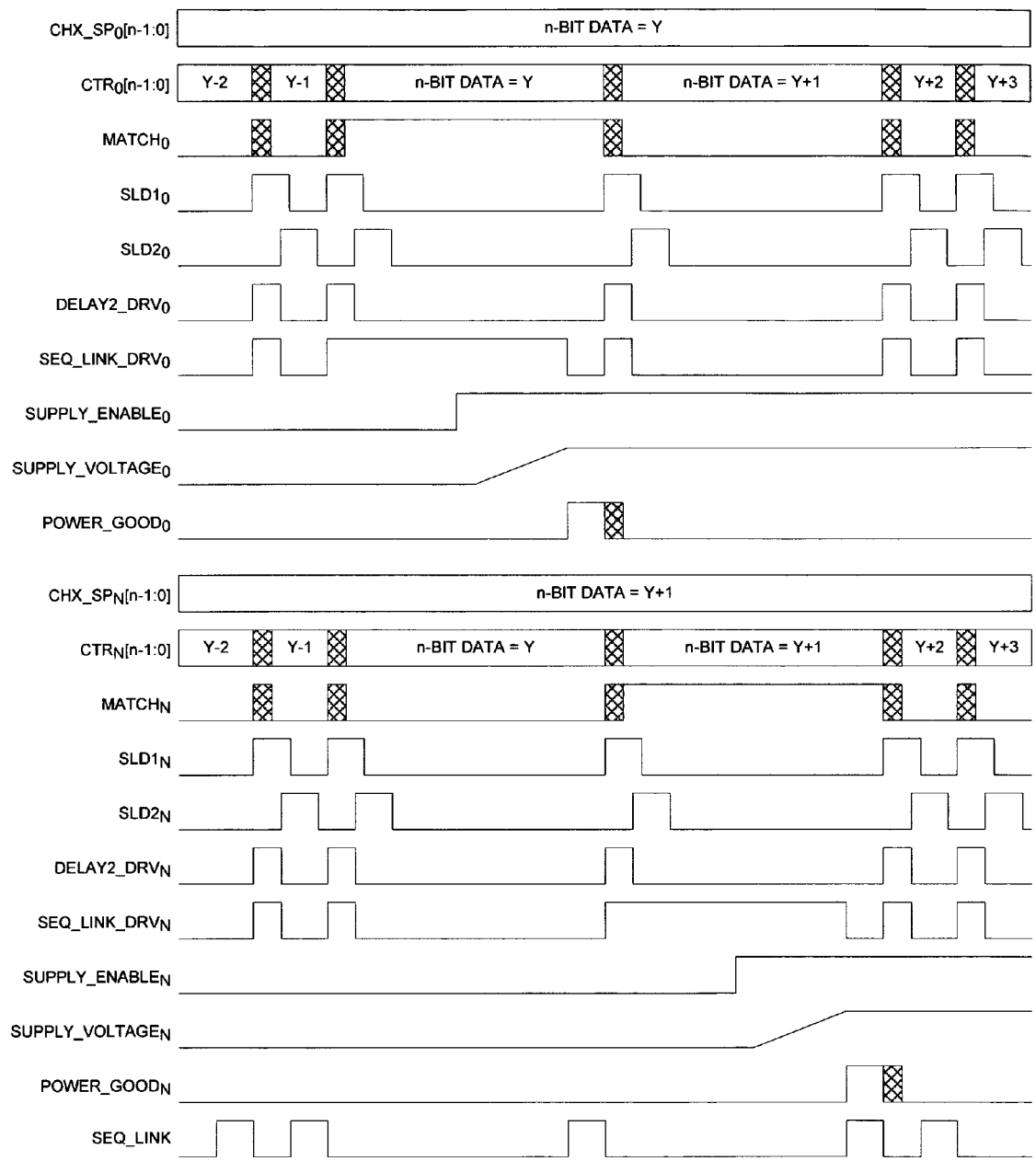

FIG. 3B is a timing diagram illustrating the operation of two sequencing logic circuits of device 0 and device 1 in FIG. 1. The PRE-PROGRAMMED n-BIT SEQUENCE POSITION 204 is configured to a value Y in the sequencing logic circuit of device 0. The PRE-PROGRAMMED n-BIT SEQUENCE POSITION 204 is configured to a value Y+1 in the sequencing logic circuit of device N.

Figure 3C:
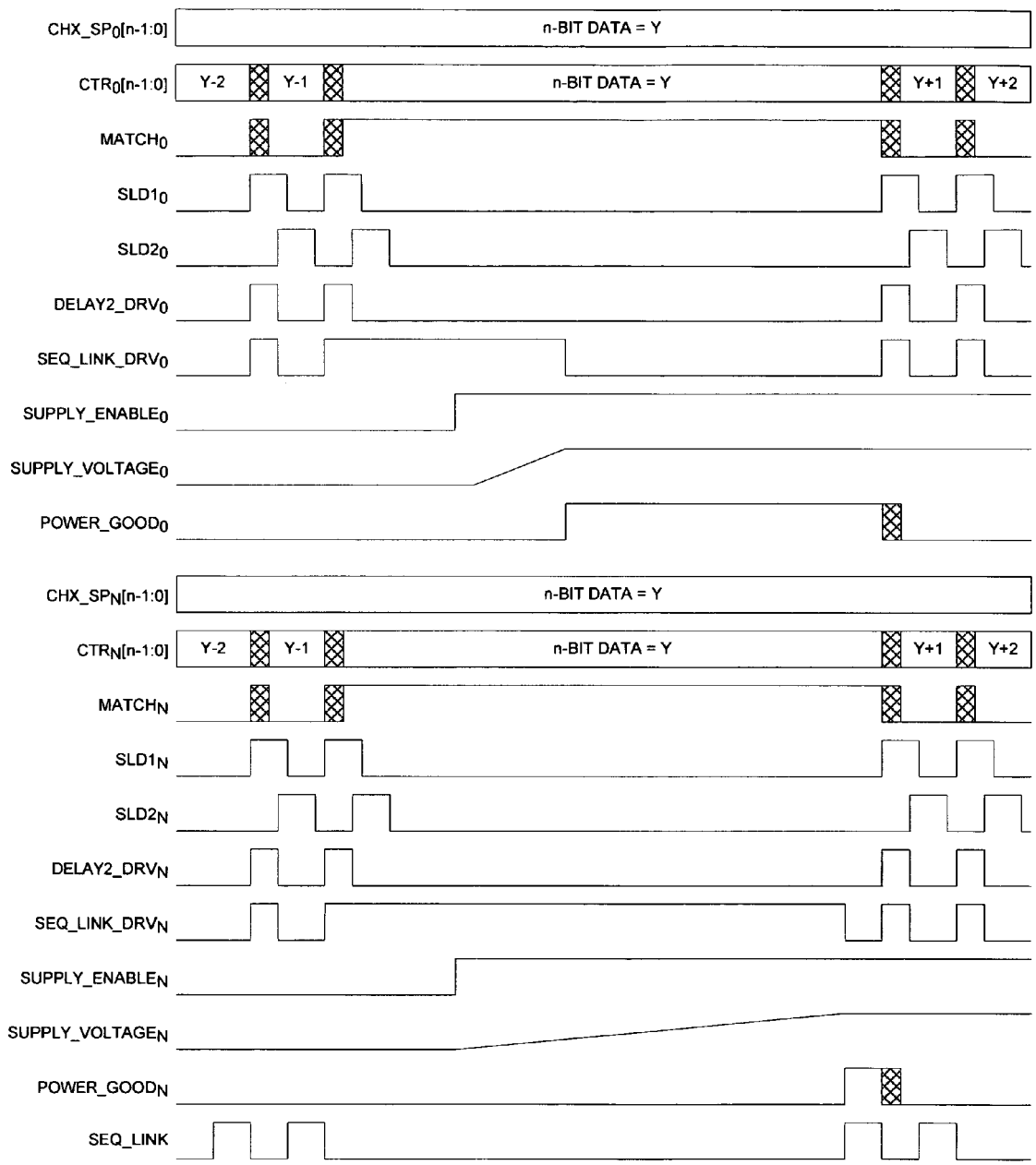

FIG. 3C is a timing diagram illustrating the operation of two sequencing logic circuits of device 0 and device 1 in FIG. 1. The PRE-PROGRAMMED n-BIT SEQUENCE POSITION 204 is configured to a value Y in the sequencing logic circuit of device 0. The PRE-PROGRAMMED n-BIT SEQUENCE POSITION 204 is also configured to a value Y in the sequencing logic circuit of device N.

Figure 4:
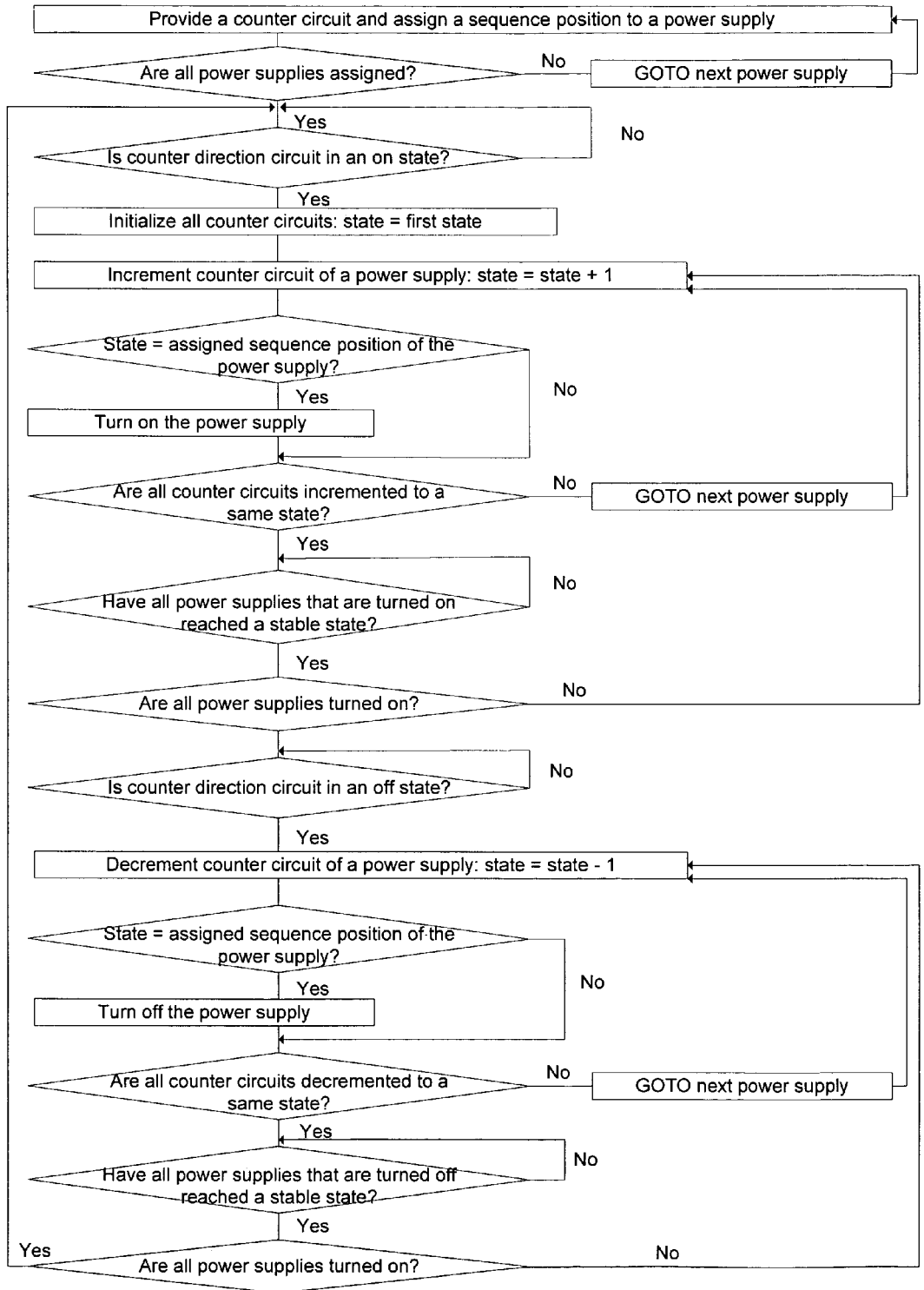
FIG. 4 is a high level logical flow chart of a method for selectively controlling the power on and power off sequence of an electronics system in accordance with an embodiment of the present invention.

FIG. 4 is a high level logical flow chart of a method for turning on a plurality of power supplies in a predetermined sequence and turning off the plurality of power supplies in a reverse sequence. It is shown that the counters increment in a power on mode and decrement in a power off mode.

Alternative embodiment 1 includes a configuration wherein the counters decrement in a power on mode and increment in a power off mode.

Alternative embodiment 2 includes a configuration wherein all the n-BIT COUNTER 201 in each of the devices in FIG. 1 are advancing synchronously but with different initial states.

Alternative embodiment 3 includes a configuration wherein multiple devices can be on a physical module and multiple sequencing logic circuits can be combined to share common components.

Alternative embodiment 4 includes a configuration wherein the sequence position configured for a power on mode is different from the sequence position configured for a power off mode.

Alternative embodiment 5 includes a configuration wherein one or more of the devices of FIG. 1 enable and monitor electronic components other than power supplies.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that connections or networks may be wired, wireless, or a combination of wired and wireless. Other variations and embodiments are possible in light of above teachings, and it is thus intended that the scope of invention not be limited by this Detailed Description, but rather by Claims following.

I claim:

1. An apparatus for enabling a plurality of power supplies, the apparatus comprises:
   a SEQ_LINK signal: and
   a plurality of controllers, each configured with a predetermined sequence position, wherein each controller is responsive to the SEQ_LINK signal for enabling a power supply according to the predetermined sequence position, and
   wherein each controller comprises:
      a counter circuit;
      a comparator circuit wherein a match signal is determined from comparing a first state of the counter circuit to the predetermined sequence position;
      a logic circuit responsive to the match signal for enabling the power supply and detecting a stable state of the power supply after an enabling event; and
      a pulse generator circuit;
      wherein the SEQ_LINK signal is in operational communication with each controller responsive to each pulse generator circuit;
      wherein the SEQ_LINK signal is in operational communication with each controller for advancing each counter circuit.

2. The apparatus of claim 1, wherein the SEQ_LINK signal continues to advance each counter circuit synchronously and repetitively to a subsequent state until a match signals is determined in one or more controllers.

3. The apparatus of claim 2, wherein the SEQ_LINK signal is disabled upon the match signal being determined until upon the stable state of the power supply being detected.

4. The apparatus of claim 3, wherein a first delay period of a first predetermined duration is initiated by the pulse generator circuit upon determining the stable state of the power supply after the enabling event, wherein the SEQ_LINK signal initiates each counter circuit to advance to the subsequent state following the first delay period.

5. The apparatus of claim 4, wherein a second delay period of a second predetermined duration is initiated by the pulse generator circuit following the initiation of the advance of the counter circuit to the subsequent state, wherein the SEQ_LINK signal is disabled during the second delay period, and wherein the SEQ_LINK signal is further disabled following the match signal being determined until upon the stable state of the power supply being detected.

6. The apparatus of claim 5 wherein the SEQ_LINK signal is connected to an open drain wired-OR circuit with a pull-up resistor tied to a common open drain node. The wired-OR circuit is driven by the pulse generator circuit of each controller.

7. The apparatus of claim 1 wherein each of the plurality of power supplies is turned on upon being enabled.

8. The apparatus of claim 1 wherein each of the plurality of power supplies is turned off upon being enabled.

9. The apparatus of claim 1 further comprising a counter direction circuit, wherein one state of the counter direction circuit causes each counter circuit to increment upon being advanced and each power supply to be turned on upon being enabled, and wherein another state of the counter direction circuit causes each counter circuit to decrement upon being advanced and each power supply to be turned off upon being enabled.

10. The apparatus of claim 1 wherein the SEQ_LINK signal is initiated by a processor.

11. A method for turning on a plurality of power supplies in a predetermined sequence and turning off the plurality of power supplies in a reverse sequence, the method comprising the steps of:
   assigning a sequence position to each power supply;
   providing a counter circuit for each power supply;
   verifying a counter direction circuit to be in an on state;
   initializing all counter circuits to a first state;
   incrementing all counter circuits synchronously and repetitively to a subsequent state until the subsequent state matches a sequence position assigned to one or more power supplies;
   turning on one or more power supplies assigned with the matching sequence position;
   waiting for all power supplies assigned with the matching sequence position to reach a stable state;
   continuing to increment all counter circuits and to turn on one or more power supplies until all of the plurality of power supplies are turned on and all counter circuits are incremented to a second state;
   verifying the counter direction circuit to be switched to an off state;
   decrementing all counter circuits synchronously and repetitively to a subsequent state until the subsequent state matches a sequence position assigned to one or more power supplies;
   turning off one or more power supplies assigned with the matching sequence position;
   waiting for all power supplies assigned with the matching sequence position to reach a stable state;
   continuing to decrement all counter circuits and to turn off one or more power supplies until all of the plurality of power supplies are turned off and all counter circuits are decremented to the first state.

* * * * *